Sept. 12, 1967 C. R. ACKER 3,341,718
COMBINED STREET LIGHT AND RESIDENTIAL POWER CONSTRUCTION
Filed April 19, 1965 5 Sheets-Sheet 1
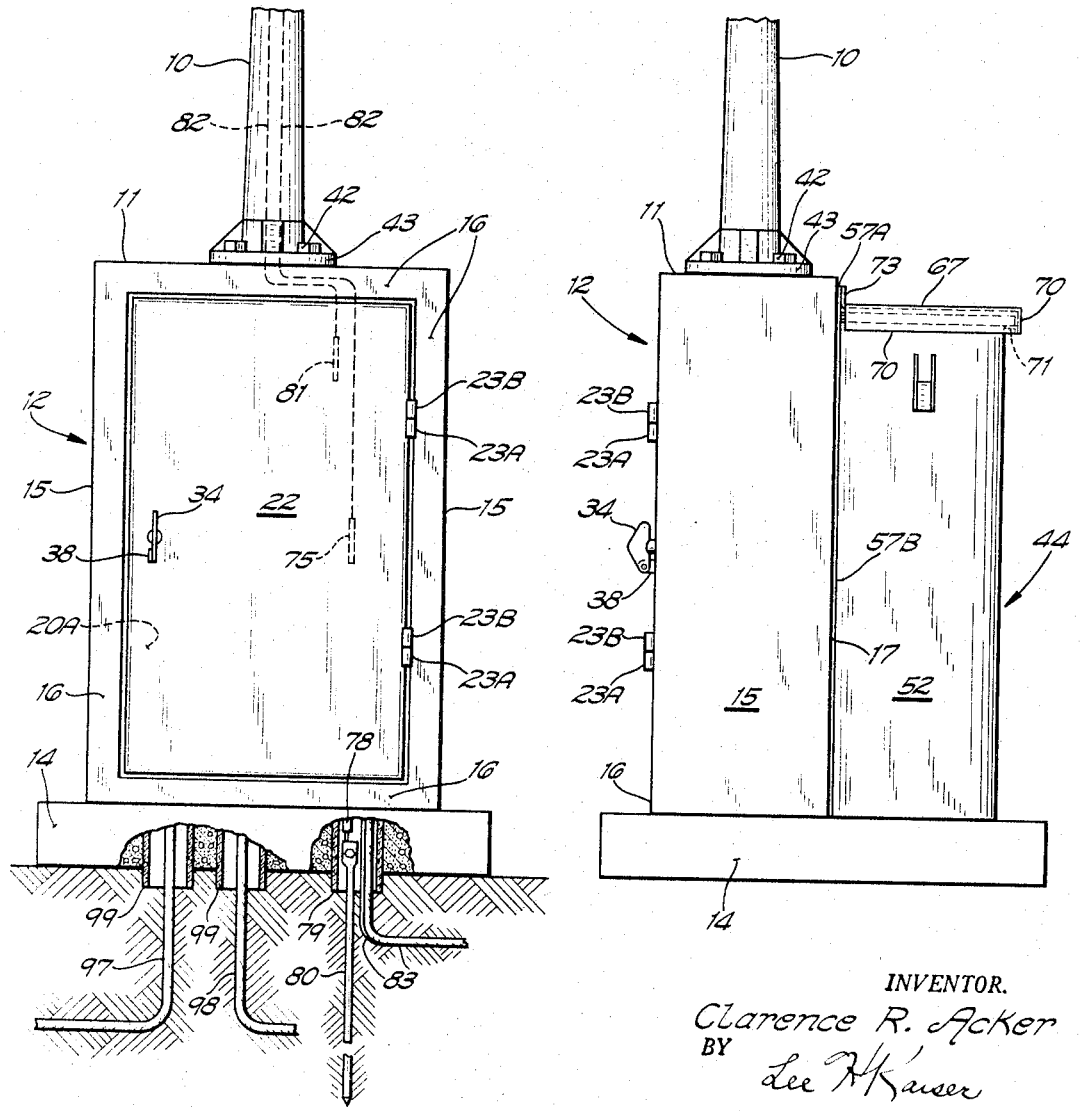
INVENTOR.
Clarence R. Acker
BY Lee H. Kaiser
Attorney Sept. 12, 1967  C. R. ACKER  3,341,718
COMBINED STREET LIGHT AND RESIDENTIAL POWER CONSTRUCTION
Filed April 19, 1965  5 Sheets-Sheet 2

INVENTOR.
Clarence R. Acker
BY
Lee H. Kaiser
Attorney

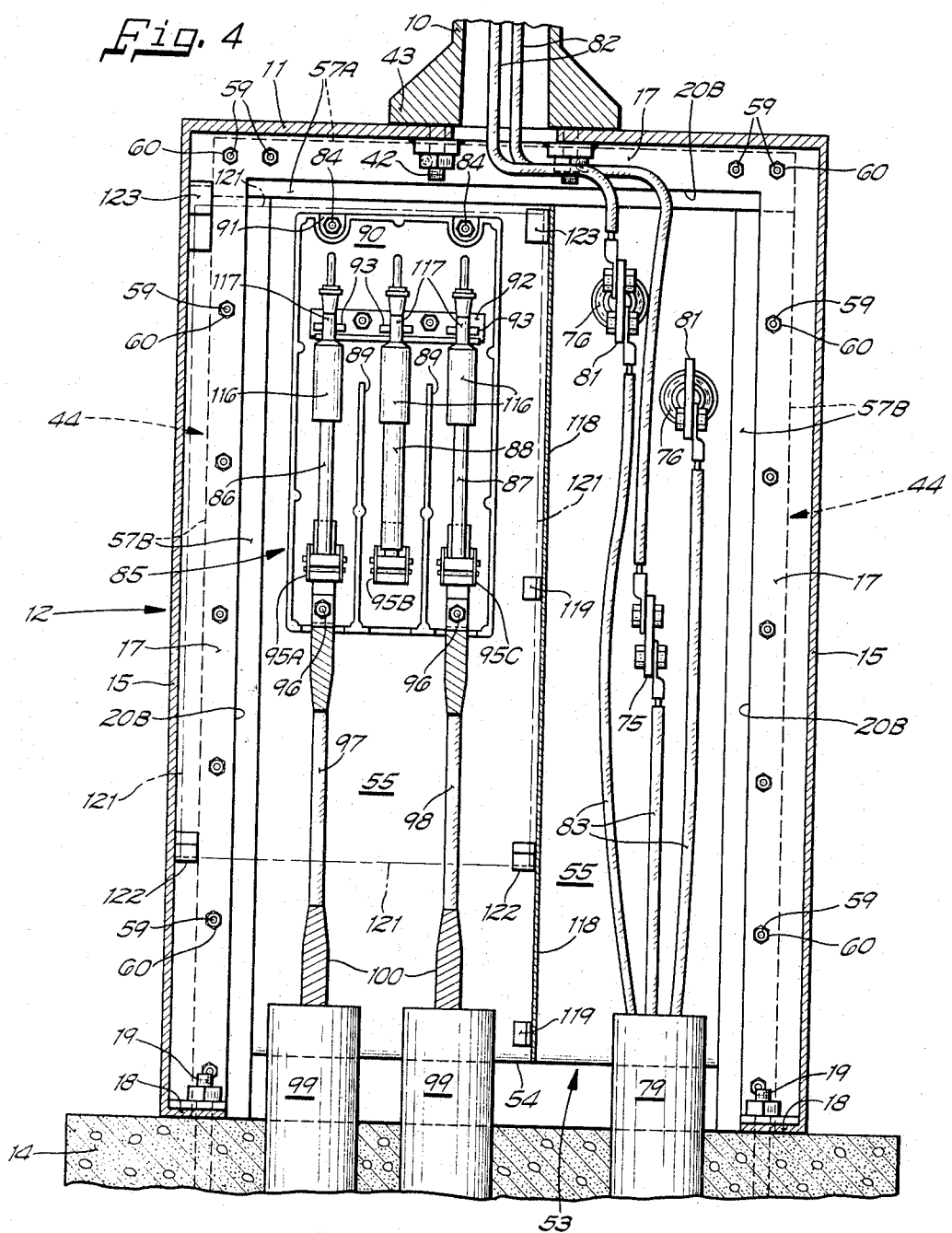

Sept. 12, 1967  C. R. ACKER  3,341,718
COMBINED STREET LIGHT AND RESIDENTIAL POWER CONSTRUCTION
Filed April 19, 1965  5 Sheets-Sheet 4

INVENTOR.
Clarence R. Acker
BY Lee H. Kaiser
Attorney

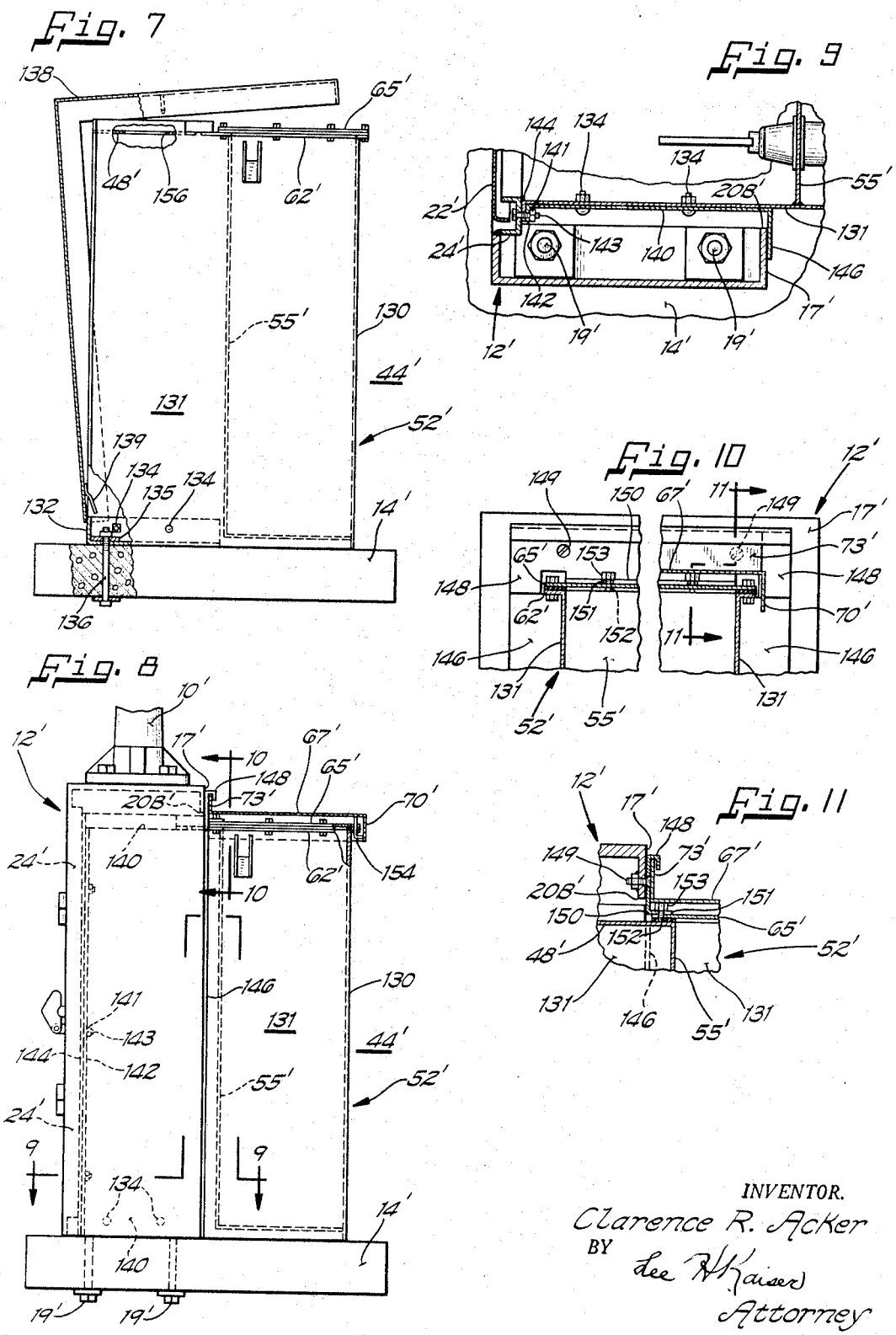

United States Patent Office 3,341,718
Patented Sept. 12, 1967

3,341,718
COMBINED STREET LIGHT AND RESIDENTIAL POWER CONSTRUCTION
Clarence R. Acker, Zanesville, Ohio, assignor to McGraw-Edison Company, Milwaukee, Wis., a corporation of Delaware
Filed Apr. 19, 1965, Ser. No. 449,064
13 Claims. (Cl. 307—157)

This invention relates to underground electrical power distribution systems and in particular to power distribution systems for residential areas.

Overhead electrical distribution systems are aesthetically displeasing and detract from the beauty of residential areas. Open wire overhead construction on crossarms and racks for residential service requires a pole on approximately every lot line, and conventonal series street lighting requires an aesthetically objectionable crossarm on the pole. In an attempt to improve the aesthetic appearance of distribution systems, electrical utilities have installed buried cable with distribution transformers enclosed within metallic housings supported on concrete pads at ground level. Although such an underground distribution system improves the appearance of residential neighborhoods and minimizes the problem of wind, ice, and tree limb damage and also reduces the likelihood of lightning damage, the high cost of known underground systems in comparison to overhead has discouraged more widespread adoption of underground distribution systems for residential areas. Such high cost can be partially attributed to the fact that in known residential systems the transformers for street lighting have been separate from those for supplying the power load and that the street lighting and telephone cables have either been overhead or in trenches separate from the trench for the power cable, thereby requiring duplication of street lighting and power facilities, crews, and installation.

It is an object of the invention to provide a residential power distribution construction which presents a pleasing appearance, enables easy maintenance, and is substantially reduced in cost in comparison to prior art systems. Another object is to provide a combined street lighting and residential power construction which eliminates the separate street lighting transformer and permits the power distribution cables to be in a common trench with street lighting and telephone conductors and thus eliminates duplication of street lighting and power installation, faciliteis, and crews. A further object is to provide a combined residential power and street lighting construction wherein the transformer is readily accessible for maintenance and which permits the transformer to be added or replaced without disturbing the street lighting pole, thereby simplifying installation or replacement of the transformer during uprating of the power system. A still further object of the invention is to provide a combined street lighting and residential power construction wherein the street light can be initially installed on a base enclosure which is complete in itself and can be used as a junction box and the transformer added at a later date. Another object is to provide a combined street lighting and residential power construction wherein the transformer is complete in itself and can be installed initially and the street light added at a later date. Still another object is to provide a residential power construction which is sufficiently pleasing in appearance to permit installation at the front lot line, thereby enabling the combination of street lighting and residential power service into one system and making the system easy to install, easy to maintain, and simple to operate. Another object of the invention is to provide a tamperproof combined residential power and street lighting construction which encloses sectionalizing and protective current limiting fuse means capable of interrupting high magnitudes of current with out noise, thus insuring that residents will not be disturbed upon fuse operation and assuring adequate protection for loads in expanding neighborhoods without requiring future changeout of switching and protective equipment. Another object of the invention is to provide a combined residential power and street light construction which permits both the primary and secondary power cables to be underground or the primary cable to be fed overhead and the secondary cable to be underground.

Other objects and advantages of the invention will be more readily apparent from the following detailed description when taken in conjunction with the accompanying drawing wherein:

FIGS. 1 and 2 are front and side views respetcively of a preferred embodiment of the invention wherein both primary and secondary power cables are underground;

FIG. 4 is a view taken on line 4—4 of FIG. 3;

FIG. 7 is a side elevation view of a ground level transformer disclosed in copending application Serial No. 315,762, now Patent No. 3,259,808, of Paul F. Gramlich;

FIG. 8 is a side elevation view showing the transformer of FIG. 7 mated with a street lighting base enclosure;

FIG. 9 is a view taken on line 9—9 of FIG. 8; and

FIG. 10 is a view taken on line 10—10 of FIG. 8 with the false cover omitted in the left portion of the view; and FIG. 11 is a view taken on line 11—11 of FIG. 10.

Figure 3:
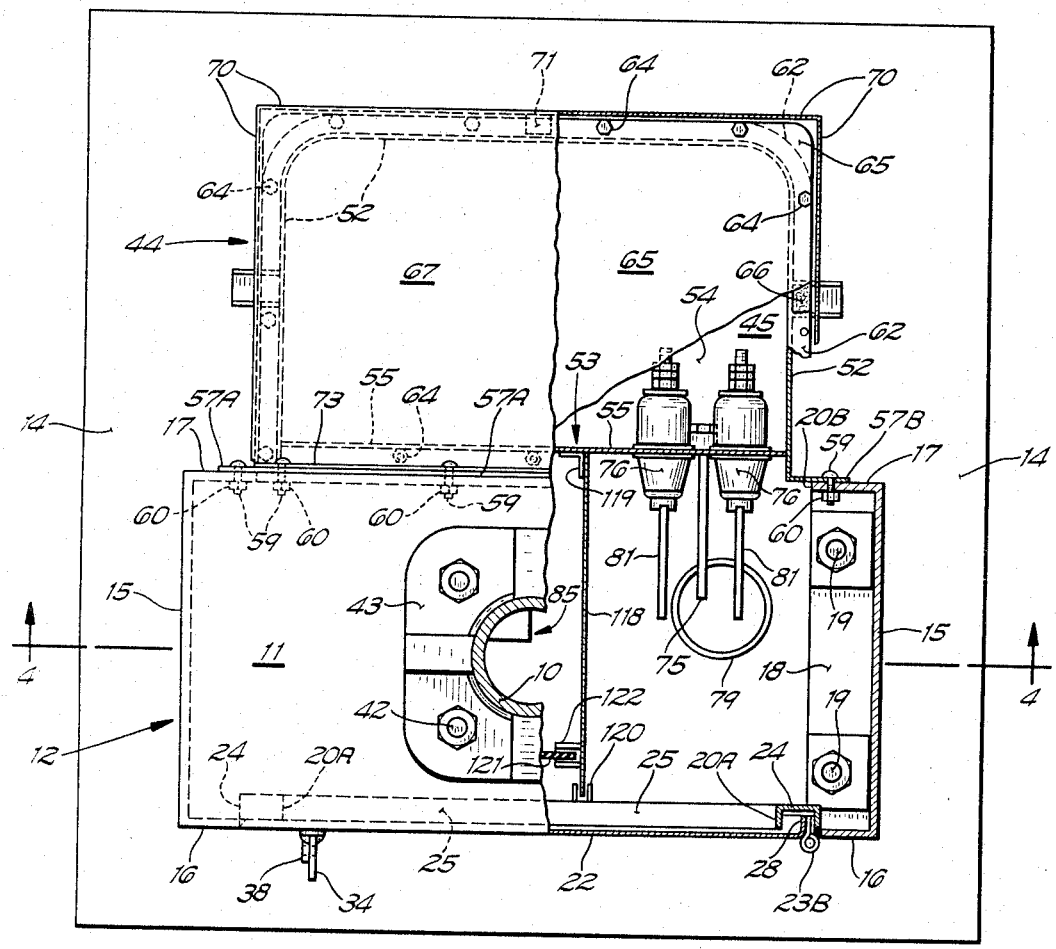
FIG. 3 is a plan view of the embodiment of FIGS. 1 and 2 with portions of the covers for the transformer tank and the base enclosure broken away to illustrate the internal construction.
Figure 6:
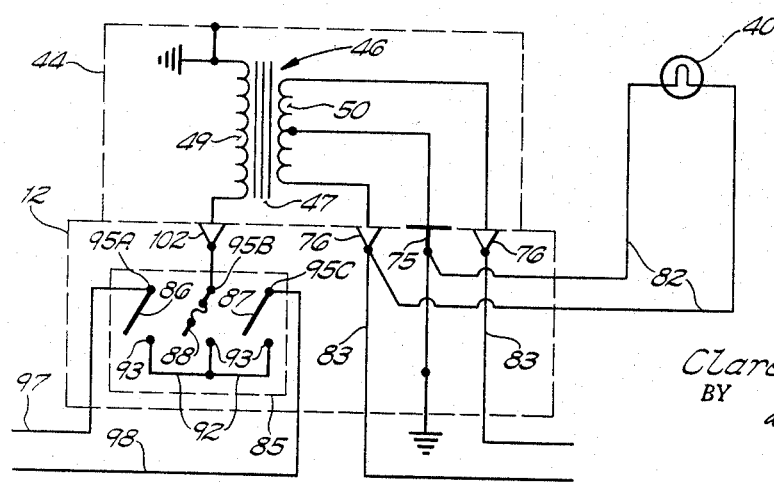
FIG. 6 is a schematic circuit diagram of the embodiment of FIGS. 1 and 2.

Referring to the drawing, a preferred embodiment of the invention includes a vertical hollow metallic pole 10 preferably of corrosion resistant material such as aluminum mounted at its lower end on the top wall 11 of a metallic base enclosure or housing 12 supported on a concrete slab 14 at ground level. Base enclosure 12 is preferably at ground level. Base enclosure 12 is preferably a right-angle parallelepiped, i.e., of box-shape, and has a pair of opposed sidewalls 15, a front wall 16, and a back wall 17. Horizontal flanges 18 (see FIGS. 3 and 4) at the bottom end of the side walls 15 rest upon concrete pad 14 and have clearance apertures for receiving anchor bolts 19 embedded in concrete slab 14 for affixing base enclosure 12 to concrete slab 14. Front and back walls 16 and 17 have large openings 20A and 20B respectively therein permitting access to the interior of base enclosure 12. The access opening 20A in the front wall of housing 12 is normally closed by a door 22 mounted on hinges 23 and being movable relative to base enclosure 12 to permit opening and closing of the door. Access opening 20A may be defined by mitered vertical channel members 24 and horizontal channel members 25 welded together at their ends, one leg of each channel member 24 and 25 being welded to front wall 16 adjacent the margin of opening 20A to provide a continuous groove of rectangular configuration for receiving the inwardly turned edges 28 of door 22, thereby providing a flush construction with surfaces on front wall 16 surrounding turned-in edges 28 on door 22. This construction prevents entry of rain and moisture into housing 12 and further positively prevents insertion of sticks or pointed objects into housing 12 by vandals or children.

Figure 5:
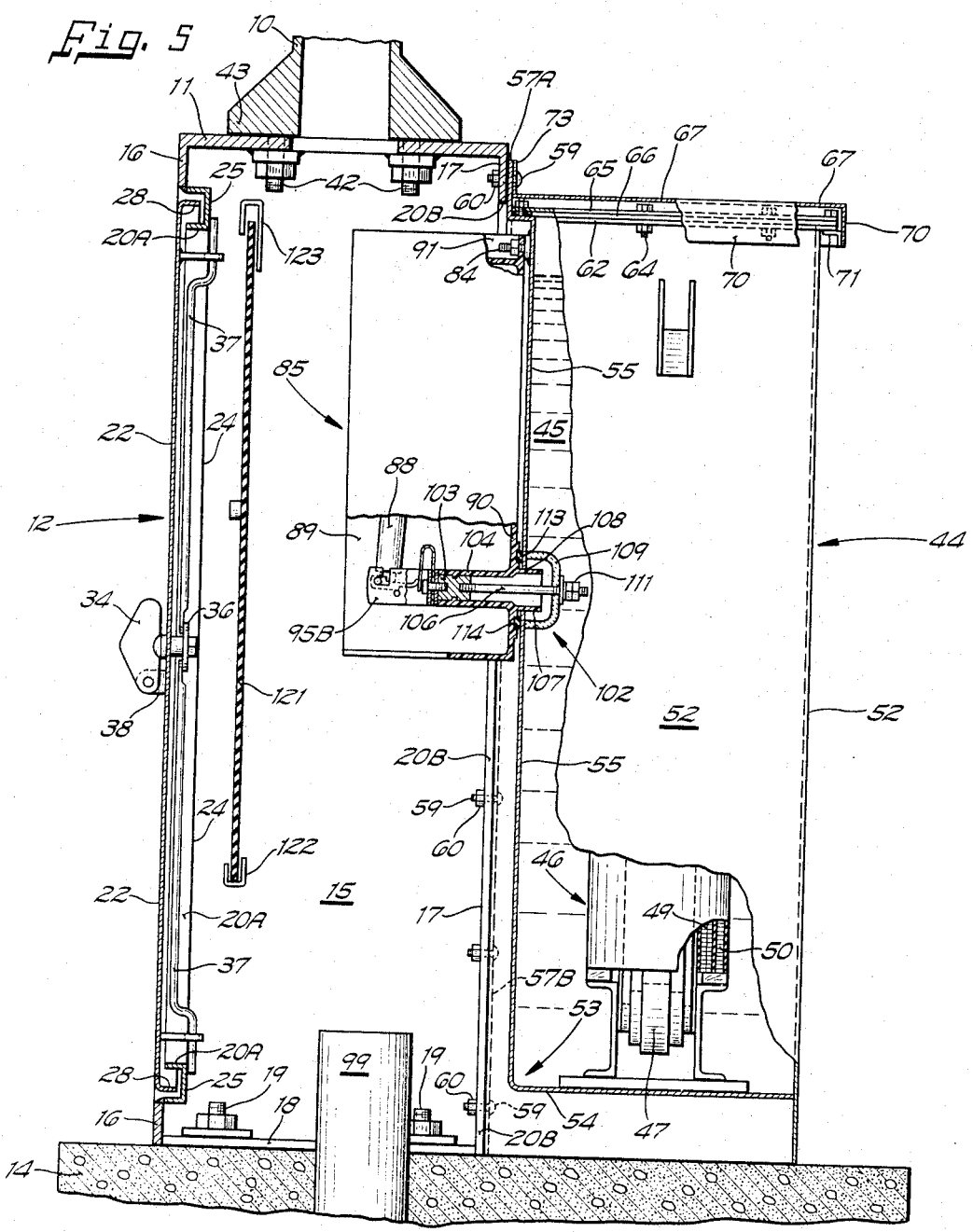
FIG. 5 is a side elevation view of the embodiment of FIGS. 1 and 2 with portions of the side walls of the transformer tank and base enclosure broken away to illustrate the internal construction.

Each hinge 23 may have a lower portion 23A welded to housing 12 provided with an upwardly extending hinge pin and an upper hinge portion 23B welded to door 22 and including an eye portion fitting over the hinge pin. Latching means for door 22 may comprise a handle 34 pivotally mounted on a shaft extending through door 22 and secured to a lever 36 (see FIG. 5) pivotally connected adjacent its ends to a pair of elongated vertically extending latching rods 37 having offset end portions adapted to fit behind horizontal channels 25, when handle 34 is turned to a vertical position, and thus prevent opening of door 22. Movement of handle 34 from the vertical to the horizontal position lifts lower rod latching 37 and lowers upper latching rod 37 from their position behind channels 25, whereby door 22 may be opened. A padlock eye 38 on the front of door 22 registers with a padlock opening in handle 34 to permit locking handle 34 in the vertical position wherein door 34 is locked closed.

The interior of hollow pole 10 communicates with the interior of enclosure base 12. In the embodiments illustrated in the drawings, a street light luminaire 40 is mounted at the upper end of pole 10, whereas in alternative embodiments, not illustrated, a mast arm may be mounted adjacent the upper end of the pole and the street light luminaire supported on the mast arm. Bolts 42 extending through clearance apertures in a support plate 43 integral with the bottom of pole 10 may affix pole 10 to base enclosure 12.

A sealed transformer casing 44 is detachably secured to base enclosure 12 and normally closes opening 20B in the back wall 17 of base enclosure 12. Casing 44 preferably contains an insulating dielectric liquid 45 such as transformer oil and encloses a transformer core and coil assembly 46 (see FIG. 5) immersed in the oil 45 and including a magnetic core 47 linked by transformer primary and secondary windings 49 and 50 respectively. Casing 44 is open at its upper end and is preferably formed by a generally U-shaped member 52 (see FIG. 3) disposed in vertical planes which defines the backwall and the two sidewalls of the casing and is welded to an L-shaped member 53 which fits within the U-shaped member 52 and defines the bottom wall 54 and the front wall 55 of casing 44. The lower edge of U-shaped member 52 rests on concrete slab 14, whereas the bottom wall 54 is preferably raised above concrete slab 14 and front wall 55 is preferably recessed inwardly from the ends of the legs of U-shaped member 52.

A flange 57 is provided on transformer casing 44 extending outwardly adjacent the top and side edges of front casing wall 55. The upper vertically extending portion 57A (see FIG. 5) of flange 57 is preferably formed by an offset portion at the upper end of L-shaped member 53. The horizontally extending portions 57B (see FIG. 3) of flange 57 are preferably formed by bending over the vertically extending ends of U-shaped member 52. Flange 57 normally abuts against the back wall 17 of base enclosure 12 in surrounding relation to opening 20B in back wall 17, and registering square holes in flange 57 and in the portion of back wall 17 defining opening 20B receive carriage bolts 59 engaged by nuts 60 within the interior of base enclosure 12. Carriage bolts 59 and the nuts 60 form means for detachably securing transformer casing 44 to base enclosure 12, and it will be obvious that such detachable means are only accessible from the interior of base enclosure 12.

The upper edge of U-shaped member 52 is bent over to form a horizontal flange 62. The flange 62 is provided with a plurality of spaced apart holes which receive bolts 64 for releasably clamping a handhole cover 65, which normally closes the open upper end of casing 44, against flange 62 with a continuous resilient gasket 66 compressed therebetween. Cover 65 provides easy access to the transformer core and coil assembly 46 for service and maintenance. Access to the bolts 64 which releasably secure cover 65 is prevented by a false cover 67 having depending edges 70 which extend downwardly beyond handhole cover 65. False cover 67 is provided adjacent its rear edge with a lug 71 which fits beneath horizontal flange 62 and at its front end with an upstanding flange 73 provided with square holes which register with similar holes in the back wall 17 of housing 12 and receive the carriage bolts 59 which detachably secure the transformer casing 44 to the enclosure base 12, thereby securing false cover 67 in place and permitting removal of false cover 67 only from inside base enclosure 12.

Casing front wall 55 may carry a grounding terminal 75 and a plurality of low voltage bushings 76 which extend through the opening 20B in the back wall 17 and into the interior of base enclosure 12. Grounding lug 75 may be connected through a conductor 78 (see FIG. 1) which extends through a conduit 79 in concrete slab 14 to a metallic grounding rod 80 driven into the earth to insure safety of persons coming into contact with base enclosure 12 or casing 44. The low voltage bushings 76 may be of conventional construction and may have spade type terminals 81 provided with conductor stud portions extending into the interior of casing 44 and connected to the ends of transformer low voltage winding 50. Suitable conductors 82 affixed to a terminal 81 on a secondary bushing 76 and to grounding terminal 75 respectively may be disposed within hollow pole 10 and electrically connected to street light luminaire 40 through a suitable relay (not shown) controlled by photoelectric cell means for turning on and off the street light. Underground secondary cables 83 connected to the terminals 81 on secondary bushing 76 and to grounding terminal 75 may extend through conduit 79 in concrete slab 14 and through a trench and be connected to adjacent residential loads.

Front wall 55 of transformer casing 44 may also carry protective means for transformer core and coil assembly 46 and sectionalizing switches for connecting the transformer in a loop distribution system. Such switching and protective means is preferably of the type disclosed in the copending application Ser. No. 315,762 of Paul F. Gramlich filed October 14, 1963, and having the same assignee as the present invention and includes an insulating switch housing 85 mounted on front wall 55 and enclosing primary sectionalizing switches 86 and 87 and a fuse disconnect 88. The primary switches 86 and 87 and the fuse disconnect 88 are separated by vertically extending barriers 89 molded integrally with switch housing 85. The switch housing 85 is affixed by studs 84 (see FIGS. 4 and 5) welded to front wall 55 and extending through clearance apertures in the bottom wall 90 of switch housing 85 into elongated depressions 91 molded in the upper wall of housing 84. A common metallic bus bar 92 carrying three stationary jaw contacts 93 for disconnect fuse 88 and sectionalizing switches 86 and 87 is mounted adjacent the upper end of switch housing 85. Three hinge contacts 95 for the fuse disconnect 88 and the sectionalizing switches 86 and 87 are provided adjacent the lower end of switch housing 85, and the outer hinge contacts 95A and 95C include depending line terminals 96 for the incoming and outgoing primary underground cables 97 and 98 of a loop type power distribution system. The underground primary cables 97 and 98 may extend through conduits 99 in concrete slab 14 into the interior of base enclosure 12 and be connected through stress grading cones 100 to the line terminals 96 on the sectionalizing switches 86 and 87.

The middle hinge contact 95B for disconnect fuse 88 does not include a line terminal but rather is connected to the transformer primary winding 49 within casing 44 through a primary insulating bushing 102. Middle hinge contact 95B is mounted on a metallic insert 103 (see FIG. 5) molded within a tubular boss 104 on the bottom wall 90 of switch housing 85. A conductor stud 106 extends axially through tubular boss 104, through an outwardly extending boss 107 on the bottom wall 90, through an aperture 108 in casing front wall 55, and through the axial opening in a generally hemispherical member 109 of suitable insulating material such as porcelain disposed within casing 44. Conductor stud 106 at one end is engaged within a threaded aperture in metallic insert 103 and at the other end is engaged by nuts 111 which clamp porcelain member 109 against front wall 55 and also compress an annular resilient gasket 113 between the outer surface of front casing wall 55 and the bottom wall 90 of switch housing 85. Gasket 113 is confined within an annular groove 114 molded in the bottom wall 90 of switch housing 85 and provides a hermetic seal for casing 44 at the primary bushing 102.

The disconnect switches 86 and 87 and fuse disconnect 88 are of the type disclosed in the copending application of Harvey W. Mikulecky, Ser. No. 298,862, filed July 31, 1963, now Patent No. 3,251,273, and having the same assignee as the subject invention. These load-break disconnecting devices have insulating sleeves 116 (see FIG. 4) adapted to come into covering relation with the movable switch blade 117 when the switch blade is opened and permit interruption of currents up to 200 amperes at voltage ratings up to 8000 volts, thereby permitting interruption of full load transformer current and also full load current on the feeder cable of the loop type system with only minor evolution of hot ionized gases. The current limiting fuse 88 is preferably of the type disclosed in the copending application of Harvey W. Mikulecky, Ser. No. 313,640 filed October 3, 1963, now abandoned, and having the same assignee as the subject invention and permits interruption of fault current through 40,000 amperes without appreciable noise.

A sheet metal baffle 118 separates the secondary compartment containing low voltage bushing 76 from the primary compartment which contains insulating switch housing 85 and the stress cones 100 for the primary cables 97 and 98. Barrier 118 may be secured at one vertical edge to angle iron support members 119 affixed to front wall 55 of transformer casing 44 and may be guided at the opposite vertical edge by U-shaped clips 120 affixed to horizontal channel members 25 of the base enclosure 12. A front insulating cover 121 for the high voltage switching compartment is supported on lower lugs 122 and upper lugs 123 welded to barrier 118 on the transformer casing 44 and to one sidewall 15 of base enclosure 12, and insulating cover 121 may be easily removed by first lifting it clear of lower lugs 122 and then moving it outwardly and down.

It will be appreciated that the base enclosure 12 supporting street light pole 10 can be installed initially as an independent and self-contained unit and the transformer casing 44 added at a later date, in which event the street light luminaire would be energized over a secondary underground cable 83 from an adjacent transformer extending through conduit 79 into the interior of base enclosure 12. The base enclosure 12 then serves only as a junction box and support for the pole 10, and a suitable cover (not shown) for opening 20B in rear wall 17 is detachably secured by carriage bolts 59 to base enclosure 12. Because the transformers are detachable, installation or replacement during uprating of the power system is simplified. A transformer 44 can be added or replaced without disturbing the base enclosure 12 or the street light pole 10.

Inasmuch as the street light 40 is served from the same transformer which serves residential loads over the secondary underground cables 83, the load factor of the transformer is improved. Elimination of the separate street lighting transformer and permitting the street lighting cables to be in the same trench with the power distribution cables eliminate duplication of street lighting and power installation, facilities, and crews and result in a substantial decrease in the cost of the residential power system. The combined base enclosure 12, transformer casing 44, and street light pole 10 present a pleasing appearance and cost considerably less and are considerably cheaper to install than separate street light pole, street light transformer, and power transformer.

The disconnect switches 86 and 87 permit sectionalizing and interruption of load current on a loop distribution system, and the current limiting fuse disconnect 88 operates without noise and will interrupt fault current through 40,000 amperes, thus contributing to good public relations for the utility and assuring adequate protection for loads in expanding neighborhoods without requiring future changeout of the switching and protective equipment.

FIGS. 7 to 11 illustrate an embodiment of the invention wherein a conventional ground level transformer which is complete in itself, tamperproof, and safe for installation in residential areas, similar to that disclosed in the aforementioned application Ser. No. 315,762 of Paul F. Gramlich, may be installed initially and the base enclosure with light pole supported thereon subsequently added. Parts similar to those of the embodiment of FIGS. 1 to 6 are given the same reference numerals with the addition of the prime designation ('). FIG. 7 shows the ground level transformer as initially installed independent of the base enclosure. The legs of the U-shaped member 52' which forms the back wall 130 and the side walls 131 of the oil filled transformer casing 44' extend a substantial distance beyond the front wall 55'. Casing 44' is secured to concrete slab 14' by means of a U-shaped sill 132 of angle cross section disposed at the lower front end of casing 44'. The legs of U-shaped sill 132 are secured to casing side walls 131 by bolts 134 which extend through clearance holes in casing side walls 131. Sill 132 is affixed to concrete slab 14' by triangular clips 135 which fit over the horizontally extending leg of the angle cross section sill 132 and are secured by anchor bolts 136 to concrete slab 14'.

An inverted L-shaped cover 138 defines the front and top walls of the ground level transformer when it is initially installed without the street light base enclosure, and cover 138 normally closes the primary and secondary compartments and prevents access to the handhole cover 65'. Cover 138 has a pair of inverted generally L-shaped members 139 welded thereto adjacent its lower end adapted to fit over sill 132 and releasably secure the lower end of cover 138 to transformer casing 44' so that cover 138 may be disengaged by merely lifting cover 138 after the padlock is removed. When cover 138 is in place, the handhole cover 65', the high and low voltage bushings, the disconnect switches and the disconnect fuse, and the primary and secondary cables are concealed, and the ground level transformer is tamperproof and safe for use in residential areas.

If it is desired to subsequently install a street light, L-shaped cover 138 is discarded and the street light base enclosure 12' is secured to transformer casing 44' by a pair of vertical U-shaped adapter plates 140 (see FIGS. 8 and 9). Adapter plates 140 extend upward to flange 62' on casing 44' and are secured to casing side walls 131 by the bolts 134 which initially affixed sill 132 to casing side walls 131. The sill 132 may alternatively be left in place or removed as desired when casing 44' is mated with base enclosure 12', but in order to simplify the drawing and facilitate the understanding of the invention, FIGS. 8 and 9 of the drawing omit the sill 132 and the clips 135 and show the bolts 134 securing the adapter plates 140 to casing side walls 131. Adapter plates 140 are affixed to casing side walls 131 before transformer casing 44' is inserted into base enclosure 12'. As best seen in FIG. 9, nuts 141 welded to the rear of a horizontally extending front flange 142 on adapter plate 140 receive bolts 143 which extend through aligned clearance holes in: (a) vertical channel member 24' of base enclosure 12', (b) the horizontally extending vertical flange 144 at the end of casing side wall 131, and (c) flange 142 on adapter plate 140. Tightening of bolts 143 pull adapter plate 140 tight against channel member 24' on base enclosure 12' with vertical flange 142 clamped therebetween and thus secures transformer casing 44' to base enclosure 12'. Door 22' on base enclosure 12' covers the heads of bolts 143 when door 22' is closed.

A horizontally extending rear flange 146 on adapter plate 140 overlaps the back wall 17' on base enclosure 12' to close the access opening 20B' in the rear wall 17' of base enclosure 12'.

A member 148 of inverted J-shape cross section is secured to back wall 17' of base enclosure 12' above access opening 20B' by flat head bolts 149 before base enclosure 12' and transformer casing 44' are mated. Member 148 depends to approximately the upper surface of flange 62' and has a horizontally and rearwardly extending flange 150 disposed above handhole cover 65' when base enclosure 12' and transformer casing 44' are mated. Flange 150 has slots 151 therein which accommodate the studs 152 which affix handhole cover 65' in place. When nuts 153 threaded on studs 152 are tightened, they are urged against horizontal flange 150 of U-shaped member 148 and thus secure the transformer casing 44' to the rear of base enclosure 12'. The upstanding flange 73' on false cover 67' fits beneath the depending lip on inverted J-shaped member 148, and a depending eye 154 on the rear of false cover 67' fits within a slot in flange 62' and is adapted to receive a padlock (not shown) to lock false cover 67' in place. The upstanding flange 73' on false cover 67' conceals the flat head bolts 149 which secure U-shaped member 148 to base enclosure 12' and the depending edges 79' on false cover 67' prevent access to the nuts which secure handhole cover 65' in place.

Upstanding flange 73' fitting beneath U-shaped member 148 forms a watershed which prevents entry of moisture into base enclosure 12'.

A knockout plate in the upper wall 48' of transformer casing 44' is removed before casing 44' is mated with base enclosure 12', and the conductors (not shown) which connect the secondary bushings to the street light extend through the aperture 156 in wall 48' formed upon removal of the knockout plate. When the transformer is utilized by itself, L-shaped cover 138 conceals the knockout plate.

Base enclosure 12' is preferably secured to concrete slab 14' by anchor bolts 19' to assure that the assembly is capable of withstanding the cantilever forces exerted on light pole 10'.

In certain embodiments of the invention the primary cable is not underground, and a single overhead primary conductor (not shown) is secured to an insulator at the top of pole 10 and is connected by a stub cable (not shown) extending through hollow pole 10 and connected to the transformer primary winding in the manner disclosed in copending application Ser. No. 266,952 filed March 21, 1963, now Patent No. 3,187,175, of Richard J. Lang, said application having the same assignee as the subject invention. In such overhead fed embodiments of the invention, the pole 10 is subject to high cantilever forces due to the overhead conductor, and base enclosure 12 is capable of withstanding moments of up to 25,000 foot pounds without deformation.

While only a few embodiments of the invention have been illustrated and described, many modifications and variations thereof will be readily apparent to those skilled in the art, and consequently it is intended in the appended claims to cover all such modifications and variations which are within the true spirit and scope of the invention.

I claim:

1. In combination, a ground level housing having front, rear, side and top walls and said front and rear walls having openings therein, a hollow pole mounted on said top wall, a street light supported adjacent the upper end of said pole, a door normally closing said opening in said front wall and being movable relative to said housing to permit opening and closing thereof, a transformer casing disposed adjacent said housing and normally closing said opening in said rear wall and having an outwardly extending flange abutting against the portion of said rear wall surrounding the opening therein, means for releasably securing said flange to said rear wall and said means being releasable only from the interior of said housing, a transformer core and coil assembly including inductively linked primary and secondary windings within said casing, primary and secondary insulating bushing means on said casing extending through said opening in said rear wall into the interior of said housing and having terminal means thereon electrically connected to said primary and secondary windings respectively, conductor means within said hollow pole for connecting said street light to said terminal means on said secondary bushing means, a secondary underground cable adapted to be connected to an adjacent electrical load extending into the interior of said housing and being electrically connected to said treminal means on said secondary bushing means, and a primary cable extending into the interior of said housing and being electrically connected to said terminal means on said primary bushing means.

2. In combination, a ground level housing having front, rear, side and top walls and said front and rear walls having openings therein, a hollow pole mounted on said top wall, a street light supported adjacent the upper end of said pole, a door normally closing said opening in said front wall and being movable relative to said housing to permit opening and closing thereof, a transformer casing disposed adjacent said housing and normally closing said opening in said rear wall and having an outwardly extending flange abutting against the portion of said rear wall surrounding the opening therein, means for releasably securing said flange to said rear wall and said means being releasable only from the interior of said housing, a transformer core and coil assembly including inductively linked primary and secondary windings within said casing, a secondary bushing on said casing extending through said opening in said rear wall into the interior of said housing and carrying terminal means connected to said secondary winding, conductor means within said hollow pole for connecting said street light to said terminal means on said secondary bushing, an insulating enclosure mounted on said casing and extending through said opening in said rear wall into the interior of said housing, a metallic bus bar mounted within said enclosure and carrying three stationary contacts, three hinge contacts mounted within said enclosure in spaced relation to said bus bar, primary insulating bushing means on said casing for connecting one of said hinge contacts to said primary winding within said casing, an incoming and an outgoing underground primary cable each of which is connected to one of the other two hinge contacts, a current limiting fuse disconnect pivotally mounted on said one hinge contact and being movable into and out of engagement with one of said stationary contacts, and a pair of disconnect switches each of which is pivotally mounted on one of said other hinge contacts and being movable into and out of engagement with one of said stationary contacts, and an underground secondary cable adapted to be connected to an adjacent electrical load and extending into the interior of said housing and being connected to said terminal means on said secondary bushing.

3. In combination, a ground level housing having front, rear, side and top walls and said front and rear walls having openings therein, a hollow pole mounted on said top wall, a street light supported adjacent the upper end of said pole, a door normally closing said opening in said front wall and being movable relative to said housing to permit opening and closing thereof, a transformer casing disposed adjacent said housing and normally closing said opening in said rear wall, said casing including a U-shaped member disposed in vertical planes and defining the side and rear walls of said casing and an L-shaped member disposed within and welded to said U-shaped member and defining the bottom and front walls of said casing, the ends of said U-shaped member being bent outwardly and together with the upper end of said L-shaped member forming a flange abutting against said rear wall and surrounding the opening in said rear wall, means for releasably securing said flange to said rear wall and said means being releasable only from the interior of said housing, a transformer core and coil assembly including inductively linked primary and secondary windings within said casing, primary and secondary insulating bushing means on said front wall of said casing extending through the opening in the rear wall of said housing into the interior of said housing and having terminal means electrically connected to said primary and secondary windings respectively, and conductor means within said hollow pole for connecting said street light to said terminal means on said secondary bushing.

4. In the combination defined by claim 3 wherein said transformer casing is open at the upper end and including a cover for closing said open upper end, releasable means for affixing said cover to said casing, and a protective member disposed above said releasable cover affixing means, said means for releasably securing said flange to said rear wall normally holding said protective member in a position wherein it prevents access to said cover affixing means.

5. In combination, a ground level housing having upper and vertical wall portions and horizontally spaced first and second openings in the vertical wall portion thereof, a hollow pole mounted on the upper wall portion of said housing, a street light mounted adjacent the upper end of said pole, a transformer casing detachably secured to said housing and closing said first opening, a transformer core and coil assembly including inductively linked primary and secondary windings within said casing, a primary and secondary bushing on said casing extending through said first opening into the interior of said housing and having terminal means connected to said primary and secondary windings respectively, conductor means within said hollow pole electrically connecting said street light to said terminal means on said secondary bushing, a primary cable extending into the interior of said housing and being connected to said terminal means on said primary bushing, a door closing said second opening, and means for locking said door in closed position.

6. In combination, a ground level housing having a top wall and a vertical side wall portion and horizontally spaced apart first and second openings in said side wall portion, a hollow pole mounted on said top wall, a street light supported adjacent the upper end of said pole, a door normally closing said first opening and being movable relative to said housing to permit opening and closing thereof, a transformer casing having an open upper end and being disposed adjacent said housing so that a side wall of said casing normally closes said second opening and having a flange extending outwardly from said casing side wall abutting against the portion of said housing surrounding said second opening, a transformer core and coil assembly including inductively linked primary and secondary windings within said casing, a cover normally closing the open upper end of said casing, means for releasably securing said cover to said casing, means releasable only from the interior of said housing for normally preventing access to said releasable cover securing means, a primary and a secondary insulating bushing on said casing side wall extending through said second opening into the interior of said housing and having terminal means electrically connected to said primary and secondary windings respectively within said casing, conductor means within said hollow pole for connecting said street light to said terminal means on said secondary bushing, a primary cable extending into the interior of said housing and being electrically connected to said terminal means on said primary bushing, and means for releasably securing said flange to said housing and being releasable only from the interior of said housing.

7. In combination, a ground level housing having upper and vertical side wall portions and horizontally spaced apart openings in the side wall portion thereof, a hollow pole supported on the upper wall portion of said housing, a street light mounted adjacent the upper end of said pole, a transformer casing normally abutting against said housing and closing said first opening, means for releasably securing said transformer casing to said housing and being releasable only from the interior of said housing, a transformer core and coil assembly including inductively linked primary and secondary windings within said casing, a low voltage bushing on said casing extending through said first opening into the interior of said housing and having terminal means connected to said secondary winding, conductor means within said hollow pole electrically connecting said street light to said terminal means, an underground secondary cable adapted to serve an adjacent electrical load extending into the interior of said housing and being connected to said terminal means, a current limiting fuse disconnect mounted on said casing and extending through said first opening into the interior of said housing and having a hinge contact and a stationary jaw contact and being pivotally mounted on said hinge contact and movable into and out of engagement with said jaw contact, means including primary insulating bushing means on said casing for electrically connecting one of said contacts to said primary winding, a primary cable extending into the interior of said housing and being electrically connected to the other of said contacts, a door closing said second opening, and means for locking said door in closed position.

8. In combination, a ground level housing having upper and vertical side wall portions and horizontally spaced apart openings in the side wall portion thereof, a hollow pole supported on the upper wall portion of said housing, a street light mounted adjacent the upper end of said pole, a transformer casing normally abutting against said housing and closing said first opening, means for releasably securing said transformer casing to said housing and being releasable only from the interior of said housing, a transformer core and coil assembly including inductively linked primary and secondary windings within said casing, a low voltage bushing on said casing extending through said first opening into the interior of said housing and having terminal means connected to said secondary winding, conductor means within said hollow pole electrically connecting said street light to said terminal means, an underground secondary cable adapted to serve an adjacent electrical load extending into the interior of said housing and being connected to said terminal means, a fuse and a disconnect switch mounted on said casing and extending through said first opening into the interior of said housing, said switch having spaced apart hinge and stationary contacts mounted on said casing and being pivotally mounted on said hinge contact and movable into and out of engagement with stationary contact and said fuse being connected electrically at one end to one of said contacts, insulating bushing means on said casing for connecting the other end of said fuse to said primary winding, a primary underground cable extending into the interior of said housing and being electrically connected to the other of said contacts, a door normally closing said second opening, and means for locking said door in closed position.

9. In combination, a ground level housing having pairs of opposed side walls and a top wall and openings in each of one of said pairs of side walls, a hollow pole mounted on said top wall, a street light supported adjacent the upper end of said pole, a door normally closing one of said openings and being movable relative to said housing to permit opening and closing thereof, a transformer casing having pairs of opposed side walls and an open upper end and normally being disposed adjacent said housing and one of said casing side walls normally closing said other opening in said housing, a transformer core and coil assembly including inductively linked primary and secondary windings within said casing, a flange on said casing extending outwardly from said one casing side wall and abutting against said housing around the margin of said other opening, a cover normally closing said open upper end of said transformer casing, means for releasably securing said cover to said casing, a protective member normally disposed above said cover and preventing access to said releasable securing means, means for releasably affixing said flange and said protective member to said housing and extending into the interior of said housing and being adapted to be released only from the interior of said housing, primary and secondary insulating bushing means on said one casing sidewall extending through said other opening into the interior of said housing and having terminal means electrically connected to said primary and secondary windings respectively, conductor means within said hollow pole electrically connecting said street light to said terminal means on said secondary bushing means, and a primary cable extending into the interior of said housing and being connected to said terminal means on said primary bushing means.

10. In combination, a ground level housing having front, rear, side and top walls, said front and rear walls having openings therein, a door normally closing said opening in said front wall and being movable relative to said housing to permit opening and closing thereof, a hollow pole mounted on said top wall, a street light supported adjacent the upper end of said pole, a transformer casing disposed adjacent said rear wall and normally closing said opening in said rear wall, means for releasably securing said casing to said housing and said releasable securing means being accessible only from the interior of said housing, a transformer core and coil assembly including inductively linked primary and secondary windings within said casing, primary and secondary insulating bushing means on said casing extending through said opening in said rear wall of said housing into the interior of said housing and having terminal means electrically connected to said primary and secondary windings respectively, and conductor means within said hollow pole electrically connecting said street light to said terminal means on said secondary bushing means.

11. In the combination defined by claim 10 wherein said transformer casing is formed by a U-shaped member having the walls thereof disposed in vertical planes and defining the side and rear walls of said casing and an L-shaped member disposed within and welded to said U-shaped member and defining the bottom and front walls of said casing and wherein the ends of said U-shaped member are bent outwardly and together with the upper end of said L-shaped member define a flange abutting against the rear wall of said housing in surrounding relation to the opening in said rear wall, and wherein said releasable securing means affixes said flange to said rear wall of said housing.

12. In combination, a concrete pad disposed on the ground and having conductor passage means therethrough, a metallic transformer housing supported on said concrete pad and having a vertical wall portion defining a compartment therein, insulating dielectric fluid within said compartment, a transformer core and coil assembly immersed in said fluid within said compartment and including a magnetic core linked by primary and secondary windings, primary and secondary bushings on said vertical wall portion connected respectively to said primary and secondary windings, underground primary and secondary cables extending through said conductor passage means in said concrete pad and being connected to said primary and secondary bushings respectively, said housing having an access opening therein, a cover for said access opening having a closed position wherein it conceals said bushings and said cables and being removable from said housing, means for locking said cover closed, an enclosure having upper and vertical wall portions and first and second spaced apart openings in said vertical wall portion, said enclosure being adapted to rest on said concrete pad and to mate with said transformer housing when said cover is removed so that said housing abuts against said enclosure and said vertical wall portion of said housing closes said first opening and said bushings extend through said first opening into the interior of said enclosure, a movable closure member for said second opening, means for locking said closure member, means for securing said housing to said enclosure, a hollow vertical pole mounted on said upper wall of said enclosure, a street light supported adjacent the upper end of said pole, and electrical conductor means within said pole connecting said street light to said secondary bushing.

13. In combination, a concrete pad at ground level having conductor passage means therethrough, a metallic transformer housing supported on said concrete pad and having a vertical wall portion defining a compartment open at its upper end, a handhole cover for said compartment, insulating fluid dielectric within said compartment, a transformer core and coil assembly immersed in said fluid within said compartment and including a magnetic core linked by primary and secondary windings, primary and secondary bushings on said vertical wall portion connected respectively to said primary and secondary windings, disconnect switch means on said vertical wall portion, a primary underground cable extending through said conductor passage means in said concrete pad and being connected in series with said switch means, said primary bushing, and said primary winding, said housing having an access opening therein, a cover for said access opening having a closed position wherein it conceals said bushings, said switch means, said handhole cover, and said cable and said cover being removable from said housing, means for locking said cover closed, an enclosure having upper and vertical wall portions and spaced apart openings in said vertical wall portion and being adapted to rest on said concrete pad and to mate with and abut against said housing when said cover is removed so that said vertical wall portion of said housing closes said first opening and said bushings and said switch means extend through said first opening into the interior of said enclosure, a movable closure member for said second opening, means for locking said closure member, a hollow vertical pole mounted on said upper wall portion of said enclosure, a street light supported adjacent the upper end of said pole, electrical conductor means within said hollow pole connecting said secondary bushing to said street light, and means for securing said housing to said enclosure.

References Cited

UNITED STATES PATENTS

| | | | |
|---|---|---|---|
| 3,187,175 | 6/1965 | Lang | 174—45 X |
| 3,225,224 | 12/1965 | Rydbeck | 307—157 |
| 3,259,808 | 7/1966 | Granlich | 317—103 |
| 3,300,570 | 1/1967 | Spiece et al. | 174—38 |

ORIS L. RADER, *Primary Examiner.*

T. B. JOIKE, *Assistant Examiner.*